(12) United States Patent
Stata et al.

(10) Patent No.: US 7,720,845 B2
(45) Date of Patent: May 18, 2010

(54) SYSTEMS AND METHODS FOR UPDATING QUERY RESULTS BASED ON QUERY DELTAS

(75) Inventors: Raymond P. Stata, Palo Alto, CA (US); Patrick David Hunt, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 501 days.

(21) Appl. No.: 10/917,742

(22) Filed: Aug. 13, 2004

(65) Prior Publication Data
US 2006/0036580 A1 Feb. 16, 2006

(51) Int. Cl.
G06F 7/00 (2006.01)
G06F 17/00 (2006.01)
(52) U.S. Cl. ...................... 707/732; 715/229
(58) Field of Classification Search ................. None
See application file for complete search history.

(56) References Cited

U.S. PATENT DOCUMENTS

| | | | | |
|---|---|---|---|---|
| 5,157,783 | A * | 10/1992 | Anderson et al. | 707/4 |
| 5,251,316 | A * | 10/1993 | Anick et al. | 707/101 |
| 6,366,933 | B1 * | 4/2002 | Ball et al. | 715/203 |
| 7,162,473 | B2 * | 1/2007 | Dumais et al. | 707/5 |
| 2003/0135555 | A1 | 7/2003 | Birrel et al. | 709/206 |
| 2003/0182310 | A1 * | 9/2003 | Charnock et al. | 707/104.1 |
| 2003/0191737 | A1 * | 10/2003 | Steele et al. | 707/1 |
| 2004/0002961 | A1 * | 1/2004 | Dettinger et al. | 707/3 |
| 2005/0243609 | A1 * | 11/2005 | Yang et al. | 365/189.05 |

FOREIGN PATENT DOCUMENTS

WO WO 2004/023243 A2 3/2004

OTHER PUBLICATIONS

"Notification of Transmittal of the International Search Report and the Written Opinion of the International Searching Authority, or the Declaration" received in corresponding International application No. PCT/US2005/028708.

(Continued)

*Primary Examiner*—John R. Cottingham
*Assistant Examiner*—Mariela D Reyes
(74) *Attorney, Agent, or Firm*—Hickman Palermo Truong & Becker LLP; Eric L. Sutton

(57) ABSTRACT

Systems and methods for automatically updating queries on a data store, such as a personal content database (PCDB), are provided. A query engine runs queries against two indexes: a first index that represents a previous state of documents and a second index that represents a current state of documents. The query is run twice and a delta analysis is performed, i.e., a determination is made as to which documents have changed in some respect from the previous state to the current state, and a view or a count associated with at least one query changes in accordance with the delta analysis. Transactions may be batched dynamically by a transaction manager until an optimal number of documents have changed or a certain amount of time has passed prior to re-running the query and performing the delta analysis.

49 Claims, 7 Drawing Sheets

OTHER PUBLICATIONS

Hibino, S. et al., "Processing Incremental Multidimensional Range Queries in a Direct Manipulation Visual Query Environment" 1998 *IEEE* pp. 458-465.

Liu, L. et al., "Differential Evaluation of Continual Queries" 1996 *IEEE* pp. 458-465.

Wang, F. et al., "Temporal Queries in XML Document Archives and Web Warehouses" 2003 *IEEE*, 9 pages.

Patent Cooperation Treaty, "Notification Concerning Transmittal of Copy of International Preliminary Report on Patentability," PCT/US205/028708, dated Feb. 22, 2007, 8 pages.

Current Claims, PCT/US205/028708, 9 pages.

\* cited by examiner

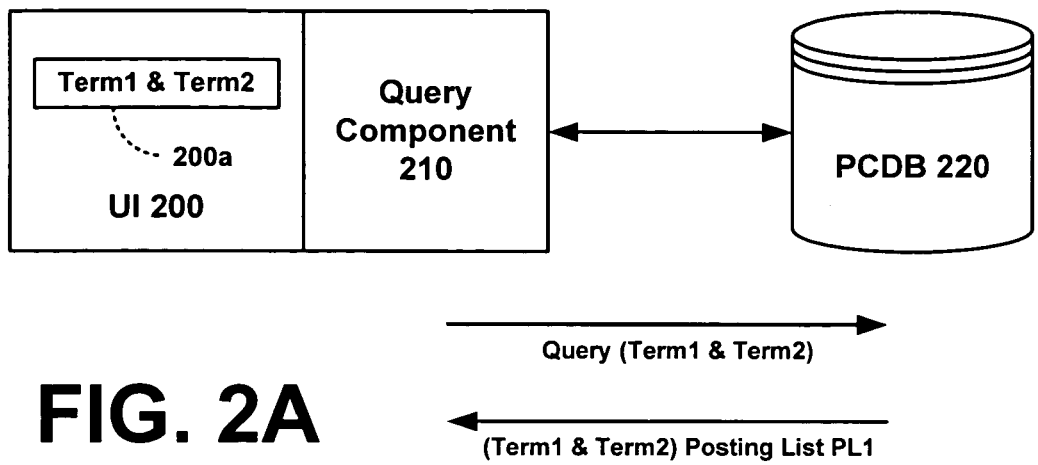
FIG. 2A
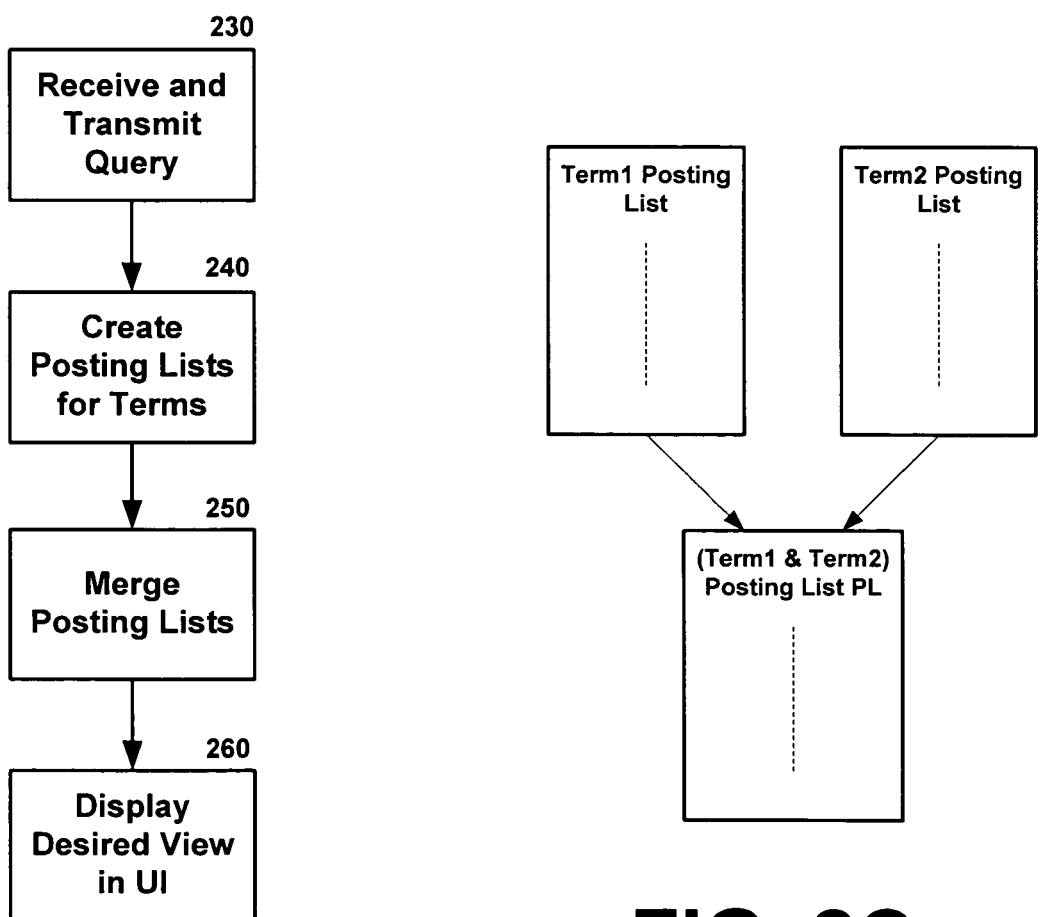
FIG. 2B
FIG. 2C

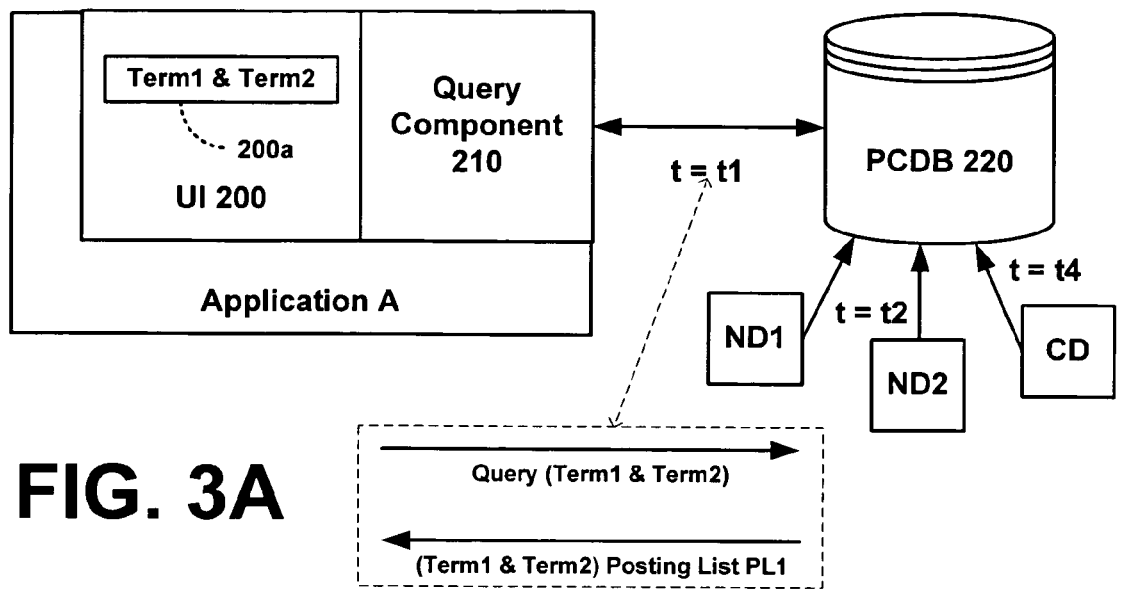
FIG. 3A
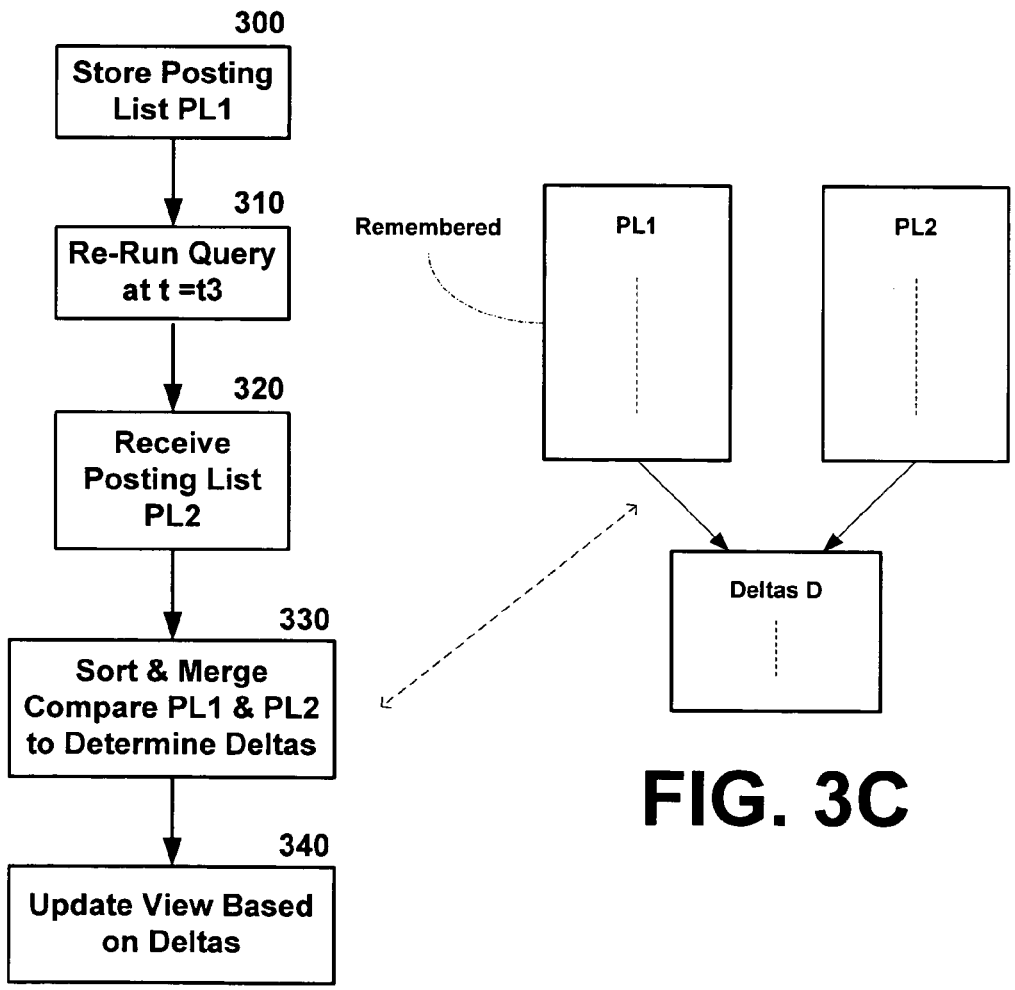
FIG. 3B
FIG. 3C

SYSTEMS AND METHODS FOR UPDATING QUERY RESULTS BASED ON QUERY DELTAS

FIELD OF THE INVENTION

The present invention is directed to systems and methods for continuously querying a data store, and more particularly, to systems and methods for automatically updating query result sets and/or query result counts in connection with a mutable data store.

BACKGROUND OF THE INVENTION

Continued growth in the sheer volume of personal digital content, together with a shift to multi-device personal computing environments, is inevitably leading to the development of Personal Content Databases (herein referred to as "PCDBs"), which will make it easier for users to find, use, and replicate large, heterogeneous repositories of personal content. An email repository is an example of a PCDB in today's terms in that users receive messages and content in heterogeneous forms. For instance, the text included in the body of an email message may be formatted according to a variety of formats and styles, may include pictures, audio or video user interface (UI) controls, hyperlinks to other content, and importantly, just about any kind of content can be attached to an email message as a separate, but associated, object. To name a few, attachments may be images (such as .jpeg files, .gif files, etc.), video (mpeg files, RealPlayer format, Quick-Time format, macromedia flash objects, etc.), audio (.mp3 files, .wmv files, etc.), contact cards (e.g., v-cards), calendar objects (Sch+ files), word processing documents (Word, WordPerfect, .pdf files), graphics files (Paint files, Visio files, etc.) and computer code (object files and source code). In essence, any object that can be created in a computing system can be shared via email, and thus, a user can appreciate that an email repository may serve as an example of the generalized notion of a PCDB.

In this regard, end users are facing at least two trends that are driving the development of these new types of "very large database"—the proliferation of data and the proliferation of devices. With respect to the proliferation of data, as mentioned above, end users are facing an explosion of email, office documents, IM transcripts, photos, video content, music, and so on, and thus people need to manage an ever increasing number of digital items. In many respects, while the number of bytes representing the content can be a separate issue, the problem identified here is that the number of items is exploding, creating overwhelming manageability overhead. Traditionally, hierarchically organized sets of folders have been the primary means of managing these items; however, folders do not scale well, and for increasing numbers of users, this problem is reaching crisis proportions. As the folder tree structure becomes massive, there are too branches to consider, and way too many leaves to uncover. In essence, folders merely save the problem for a different day in that folders by themselves add to overhead and, over time, the folders may no longer have particular relevance to the user in the manner in which they were originally organized. A folder only helps if the user remembers the folder and what is generally inside, and where to find it.

Compounding the problem is the proliferation of devices. Given multiple desktops (home, office, etc.), PDAs, smart phones, the Internet, and even in-dash car computers, the increasing volume of personal content described above is necessarily being distributed over multiple devices. Currently, movement of personal data among these devices is painful, if possible at all, and users face a hodge podge of software and services for storing the volumes of data that result. Email, for example, is sometimes stored in specialized, local files (e.g., in personal information store, or .pst, files), sometimes on servers, and sometimes replicated on both. Some office documents are stored in the local file system, but a surprisingly large number of them are stored as attachments in one's email repository. Photos are often stored in the file system, possibly indexed by specialized software running beside the file system, and also possibly replicated to a Web server. Contact information, like email, might be stored in a specialized, local file and also synchronized out to a PDA and a phone. These various storage schemes do not interoperate, are all folder based, and are difficult to manage. Currently, movement of personal data among these devices is painful, if possible at all. Over time, this needs to become seamless if users are going to be able to fully utilize their digital content, and accordingly, new ways for searching for and retrieving desired content from PCDBs efficiently and effectively are desired.

To the extent that this hodge podge of storage systems will be replaced by a single PCDB, all of the user's personal data can be encompassed: email, documents, photos, even Web pages visited by the user, from wherever generated or found or from whichever device it is retrieved. Associative retrieval, rather than folders, will be used as the primary means of organizing. The PCDB will transparently move content among a user's multiple devices, and the PCDBs of multiple users will share content with each other based on policies set by the user. PCDBs will initially be small by VLDB standards—say, tens to small hundreds of gigabytes—but current trends suggest that they will grow to terabytes.

As an illustration of PCDB principles, email is the largest, fastest-growing, and most dynamic collection of documents managed by most users, and as described above, an email store is a microcosmic representation of a PCDB. Also, email is becoming the primary gateway for bringing content into a personal environment, especially in a business setting. As an initial step in the building of robust, secure, and efficient PCDBs, therefore, it would be desirable to address current problems associated with the proliferation and retrieval of email. Searching and retrieving relevant content from a large scale email database becomes quite difficult and time consuming, and over time, as any high volume user of email recognizes, as more email is received and stored, the problem worsens. Accordingly, it would be desirable to provide a query execution model that addresses the need to search and retrieve the ever proliferating quantity of content that users receive via email.

In this regard, thanks to the success of Web search, users today can quickly understand applications that incorporate search as a user interface (UI) metaphor. If a service, such as a Web page, represents underlying content, for instance, the user quickly can appreciate that entering search terms in a UI control displayed on the Web site will retrieve content that is possibly relevant to those terms. However, with respect to email and the UI metaphor, the goals of Web and personal search tend to be quite different, and thus current UI controls and underlying algorithms for Web search are not suited to the problem of personal search. In this regard, scalable personal search is a difficult problem and for different reasons than Web.

For a brief explanation as to why, when considering only the search corpus, personal search seems much easier since the Web is vast, distributed and global whereas the desktop is local and finite. From a pure scale perspective, the Web is the harder problem, except personal search presents significant challenges in other ways that do not manifest with respect to Web search, including challenges with respect to: the activity associated with or goal(s) of the search, the computing environment, the interface and search dynamics.

First, it is easier to discover information than to recover an exact match based on incomplete information. The simple query "Aaron Burr," for instance, will yield thousands of documents about him on the Web. For the most part, information on the Internet wants to be found; it is intentionally, proactively—even aggressively—optimized for search engines results given knowledge of the underlying search algorithms. But recovery of personal information requires higher precision. There is typically only one right answer, one message or document (or version of the document!) for which the user is looking, and typically, what little metadata exists and is captured at the time an email message enters the store is not optimized for search and retrieval. Making matters worse, people typically adopt a steep discount function on time. This means users will not invest the time to organize up front (e.g., adding good associative metadata to the content)—nor should they, with the tsunami of digital information they face—so they invest it on the back end, with the expectation of a quick recovery process. Further, users know they once had the information, and so the process of looking for things can quickly feel redundant, frustrating and interminably time consuming.

When considering the computing environment, Web search engines are built from thousands to tens of thousands of dedicated machines. These machines are assigned specific tasks—some crawl, some index, some respond to queries. All the resources of a machine are dedicated to its one task. With personal machines, on the other hand, resources such as computing cycles, RAM, and I/O transactions are expected to be dedicated primarily to the user's foreground activity. When this expectation is violated, users quickly get impatient. Thus, resources for indexing and disk structure maintenance must be borrowed from this primary use. In addition, Web search engines typically house their machines in dedicated host facilities with backup servers, restoration services, and redundant power supplies. Operating systems, memory configurations and hardware configurations are all finely tuned to be application-specific. The desktop is another world entirely—it's downright hostile. File scanners of various types can lock files for long periods of time, preventing even reads from occurring. Virus detectors and "garbage collectors" feel free to delete files they deem dangerous or redundant. And of course, there are users, who feel free to remove files and even entire directories they (mistakenly) deem to be unnecessary.

Additionally, the typical interface to Web search engines supports a single task: executing queries. PCDB interfaces, on the other hand, are embedded in applications that support multiple tasks. In email, for example, finding messages is one of many tasks; users also want to view messages (and, at times, avoid reading messages), create them, and even relate them to their on-going projects. Search can support many of these tasks, but only if the UI is redesigned around the search paradigm (rather than being relegated to a mere "fast find" dialog box).

With respect to dynamics, for the purposes of an individual query, content on the Web is static. Naturally, it changes over time, but the lifetime of a Web query is far shorter than the update cycle of the index. Personal content, on the other hand, is dynamic, in two directions. First, new information is constantly being added. Emails come in and go out at a dizzying pace. New documents are created and sent and received as attachments and moreover, all sorts of content can be downloaded from the Web. Second, the information itself is dynamic over time. Emails change state as they are read, annotated, altered, sent, and filed. Plus, capturing different versions of documents is essential to the flow of business. Business contracts, negotiations and agreements all have multiple versions and retrieving the correct version can have broad and deep financial implications. In a PCDB, the lifetime of queries far exceeds these changes. As a simple example in the context of email, when looking at the Inbox (an example of a view on a PCDB) in a search-based email client, one is looking at the output of a query: as new messages enter the system, this output needs to be updated accordingly. When keeping track of many views over the PCDB simultaneously, one can see that the problem compounds and becomes daunting.

It would thus be desirable to provide a query execution model that addresses the above-described characteristics of a personal search of a PCDB, such as an email store. It would be further desirable to provide a mechanism for returning query results from a PCDB to a user interface of a device, either as a count or a view of the results. It is further desirable to provide a mechanism that updates the query results (as displayed in the UI as a count or a view) efficiently and automatically as the underlying content reflected by the search changes, with the ability to scale to many simultaneous queries. It would be still further desirable to provide a simple and efficient mechanism for providing fast, updated message counts for saved searches.

SUMMARY OF THE INVENTION

In view of the foregoing, the present invention is directed to systems and methods for automatically updating queries on a data store, such as a PCDB. In various embodiments of the invention, a query engine runs queries against two indexes: a first index that represents a previous state of documents and a second index that represents a current state of documents. The query is run twice and a delta analysis is performed, i.e., a determination is made as to which documents have changed in some respect from the previous state to the current state, and a view or a count associated with at least one query changes in accordance with the delta analysis. In one embodiment, transactions are batched by a transaction manager until an optimal number of documents have changed or a certain amount of time has passed prior to re-running the query and performing the delta analysis.

Other features and embodiments of the present invention are described below.

BRIEF DESCRIPTION OF THE DRAWINGS

The systems and methods for querying using query deltas in accordance with the present invention are further described with reference to the accompanying drawings in which:

FIGS. 2A to 2C illustrate some exemplary non-limiting underlying techniques for querying a database in accordance with the invention;

FIGS. 3A to 3C illustrate a memorization approach to solving a delta problem defined in accordance with the invention;

DETAILED DESCRIPTION OF ILLUSTRATIVE EMBODIMENTS

Overview

Figure 1A:
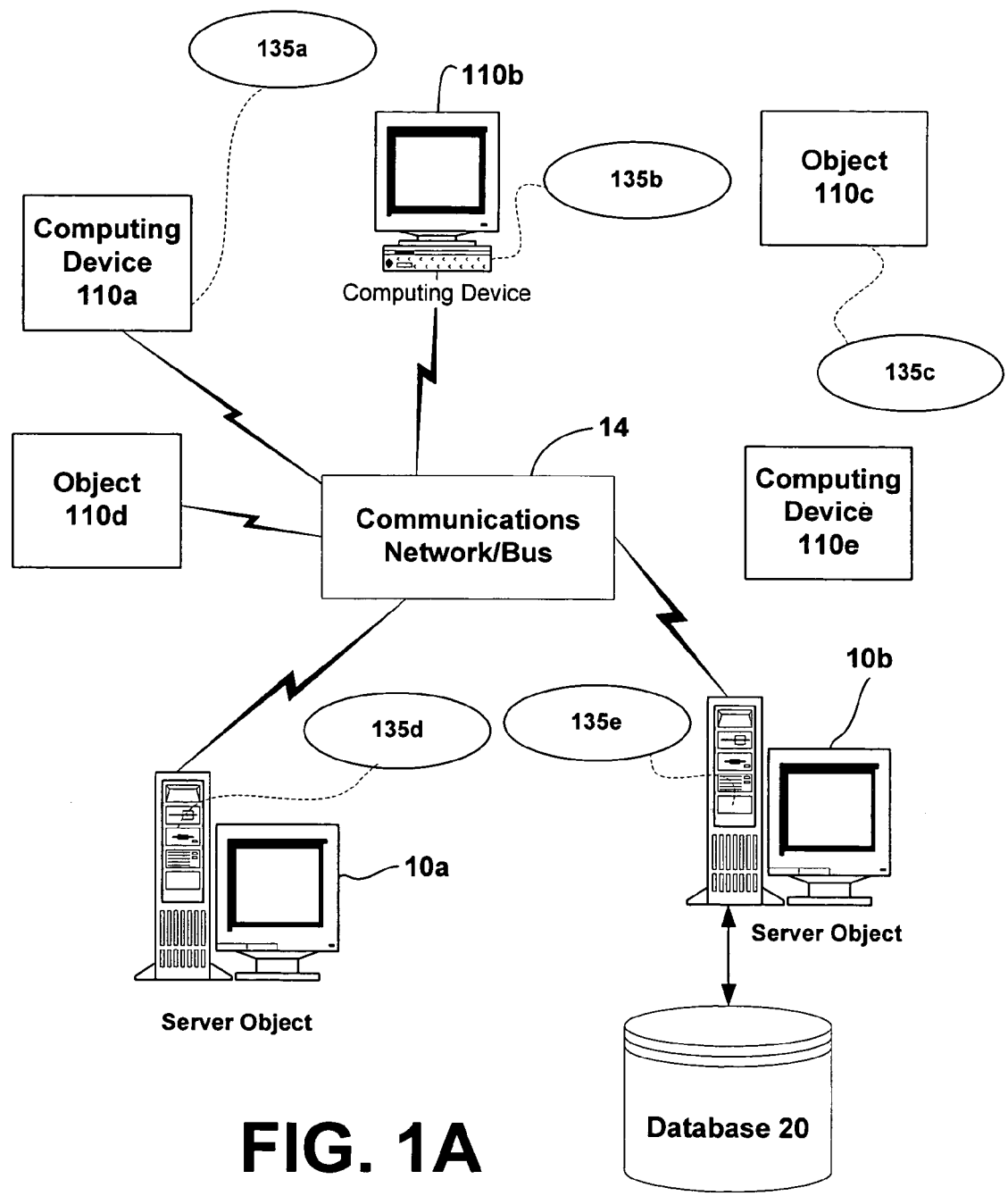
FIG. 1A is a block diagram representing an exemplary network environment having a variety of computing devices in which the present invention may be implemented.

As mentioned, the invention provides a query engine enabling query-execution threads that operate to efficiently and continuously update search results yielded from a query on a mutable data store (e.g., displayed as a count or a summary view). As described below in greater detail, the mutability of the data store defines a delta problem of how to track possibly changing documents as they are added in and/or dropping out of query result sets. Accordingly, in various embodiments of the invention, the invention automatically updates a view or count associated with a query by performing the query on both an old state of the database and a new state of the database. Based upon an analysis of the differences in the result sets, referred to as deltas, a count or view associated with the query is updated.

In the state of the art, a query runner object would be given information about only the new state. To determine whether the change represents an addition, deletion, or change, the query runner object would have to have recorded, in memory, the previous result-set it had returned. These sets can be large, which does not scale well for large numbers of long-running queries. To maintain counts accurately and efficiently, the present invention recognizes that it is not enough to know only that, for example, a document is now in a result set since it also needs to be known if the same document was previously in the result set so the count can remain the same (if it was previously in) or be incremented by one (if it was not)—or if a document no longer appears in the result set, so the count can be decremented by one.

Also, the query engine for a PCDB in accordance with the invention thus supports long-running queries that return not only an initial set of matching documents but also updates (or deltas) when either new, matching documents arrive or old documents change such that they drop in or out of the query. In one non-limiting embodiment, the query engine can return the results of these long-running queries in two forms: as a result-set of document IDs, or as a simple count of documents that currently match the query.

In this regard, long-running, automatically-updated queries are useful in the design of applications, such as email clients. In accordance with a non-limiting implementation of the invention, for example, the queries of the invention can be used to populate the "message list," a calendar user interface, to provide counts for folders and saved-searches in a navigation pane, and also to provide alerts. As this short list of uses suggests, there can be a large number of these long-running queries outstanding at any point, and accordingly, the approach of the invention was designed with the ability to scale. In short, with the proliferation of PCDBs, the invention solves the ever increasing problem of computing deltas in an efficient manner when there are a large number of queries outstanding at the same time.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with querying according to the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the querying mechanism(s) of the invention.

FIG. 1A provides a schematic diagram of an e exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10a, 10b, etc. or 110a, 110b, 110c, etc. may contain an application that might make use of an API, or other object, software or hardware, to request use of the querying mechanism (s) of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the querying mechanism(s) in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the querying mechanism(s) described herein is of great utility in such a system.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI, for instance, are also digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of the querying mechanism(s) in accordance with the present invention.

Thus, FIG. 1A illustrates an exemplary networked or distributed environment, with a server in communication with client computers via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to query a data store to retrieve information.

In a network environment in which the communications network/bus 14 is the Internet, for example, the servers 10*a*, 10*b*, etc. can be Web servers with which clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment. Communications may be wired or wireless, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof, and a user might wish to select a date with a remote control device interoperating with an on screen UI. Each client computer 110*a*, 110*b*, 110*c*, 110*d*, 110*e*, etc. and server computer 10*a*, 10*b*, etc. may be equipped with various application program modules or objects 135 and with connections or access to various types of storage elements or objects, across which files may be stored or to which portion(s) of files may be downloaded or migrated. Any computer 10*a*, 10*b*, 110*a*, 110*b*, etc. may be responsible for the maintenance and updating of a database 20 or other storage element in accordance with the present invention, such as a database or memory 20 for storing data queried according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Exemplary Computing Device

Figure 1B:
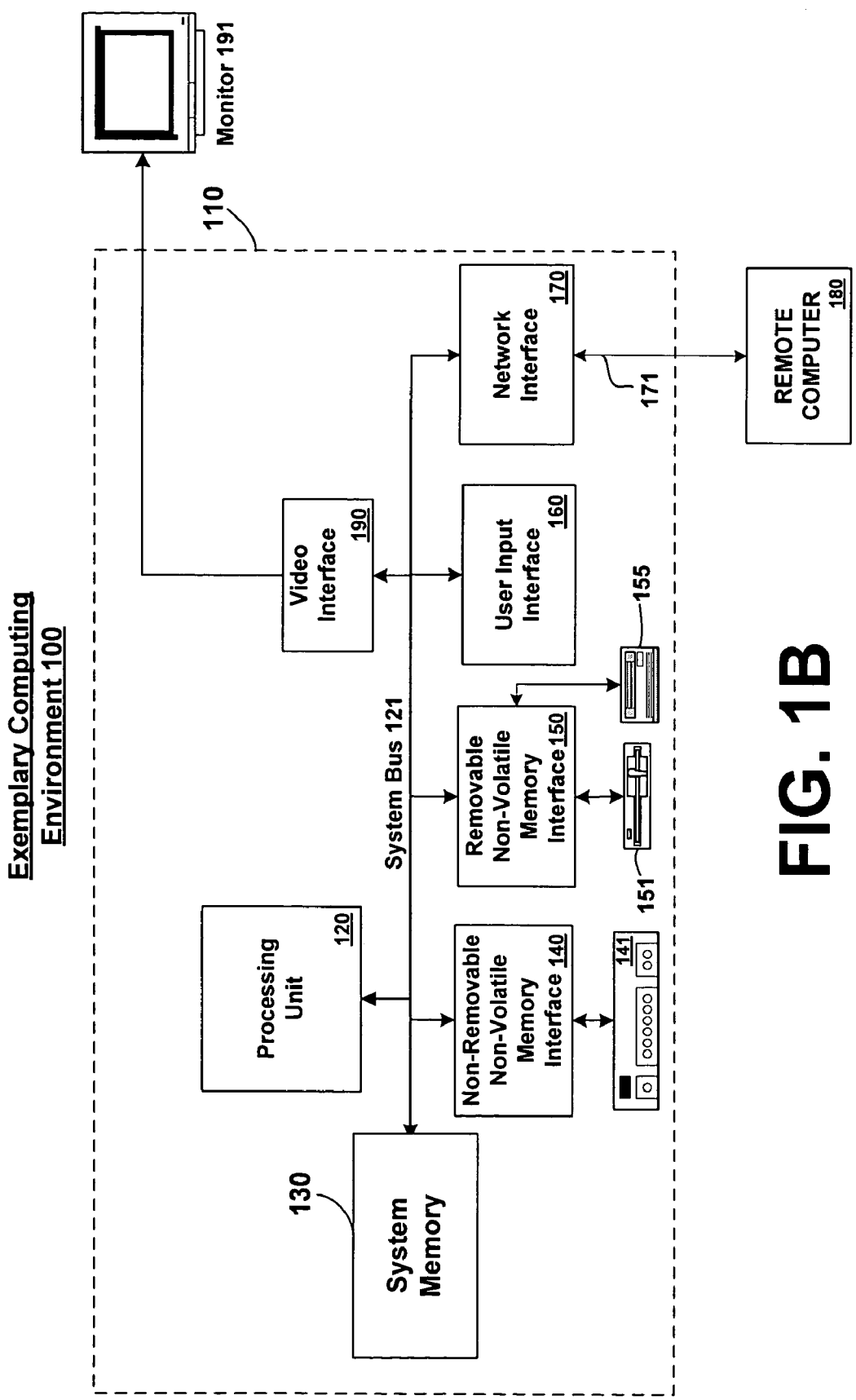
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client, or stripped down client such as a smart phone, having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that event data may be stored or from which event data may be retrieved, or where it is desirable to search and retrieve information, is a desirable, or suitable, environment for operation of the querying technique(s) of the invention.

Although not required, the invention can be implemented via an operating system, for use by a developer of services for a device or object, and/or included within application software that operates in connection with querying in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, described in more detail above, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

A user may enter commands and information into the computer 110 through input devices such as a keyboard or pointing device, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory. In addition to monitor 191, computers may also include other peripheral output devices such as speakers and a printer, which may be connected through an output peripheral interface.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 110 may also include other removable/non-removable, volatile/nonvolatile computer storage media. By way of example only, FIG. 1B illustrates a hard disk drive 141 that reads from or writes to non-removable, nonvolatile media, a magnetic disk drive 151 that reads from or writes to a removable, nonvolatile magnetic disk, and an optical disk drive 155 that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110. The logical connections depicted in FIG. 1B include a local area network (LAN) 171 via network interface 170, or alternatively a wide area network (WAN), but may also include other networks/buses. Such networking environments are commonplace in homes, offices, enterprise-wide computer networks, intranets and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, an exemplary distributed computing framework or platform includes servers, building-block services, such as Web-based data storage and downloadable device software. Generally speaking, a distributed computing framework provides (1) the ability to make an entire range of computing devices work together and to have user information automatically updated and synchronized in all of them, (2) increased interactive capability for Web sites, enabled by greater use of XML rather than HTML, (3) online services that feature customized access and delivery of products and services to the user from a central starting point for the management of various applications, such as e-mail, for example, or other software, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. In this regard, the querying mechanism(s) of the invention may be provided as an integral part of such an application development framework, such that developers can easily include the mechanism(s) in new applications, and easily deliver the querying and associated UI mechanism(s) to end users as part of various services and applications, for instance, that may search through a variety of data wherever located.

Querying and Indexing

Fast processing of full-text queries may involve the use of a full-text index of the documents being searched. A full-text index for a document collection U has an entry called a posting list for each term appearing in U. A posting list is a sequence of entries called postings which describe an occurrence of a term in a document. To find the documents satisfying a query, the query component, or query engine, looks up the posting list of each of the terms in the query and combines those lists according to the operators in the query.

For example, imagine the user enters the simple query "zoology." In this case, the query engine would look up this term in the index and return each document found in the resulting posting list. If the user enters "zoology AND textbooks," the query engine looks up both posting lists and returns their intersection. If the user enters "zoology OR husbandry," the query engine looks up both posting lists and returns their union.

The execution of a simple query is illustrated in FIGS. 2A to 2C. As shown in FIG. 2A, an application or service may include a UI component 200 that includes a UI text box control 200a for receiving terms for a query against a PCDB 220, such as an email store. A query component 210 that handles the packaging, transmission, reception and processing of results (illustrated as a single integrated component although each function may be provided as separate objects, which need not be co-located) receives a query "Term1 & Term2" and performs the query against the content in data store 220. It can be appreciated that a query can operate to examine document metadata as well as document content. For instance, a query may be associated with documents with a particular title, size, date, folder, etc.

Typically, then, as shown in FIG. 2B, after the query is received at 230, two posting lists are created at 240, i.e., one for Term1 and one for Term2 of the query. At 250, the posting lists are merge compared to reflect only documents that contain both Term1 and Term2, as shown in FIG. 2C. With a list of documents, or document IDs, that satisfy the query as represented by posting list PL, and depending upon the view desired in connection with the application including UI 200, information about the documents is displayed to the user. This might include the number of documents that satisfy the query and/or include the presentation of summary information, such as property information or other metadata, relating to the documents, or any other desirable view tailored to the posting list returned by the query engine. Thus, with a list of references to documents that satisfy the query, any view of those documents may thus be presented to the user at 260.

In some systems, a posting simply includes the identification of or reference to a document ("Doc ID") containing the term. In others, a posting may include a Doc ID plus the count in that document to aid in certain forms of rankings. In others, a posting may include the Doc ID plus a list of locations within that document where the term occurs to aid in highlighting the search terms in the result set.

Posting lists are typically stored on and accessed from disks, which are sequential-access devices. Thus, an issue with the design of full-text indexes is the order in which postings are kept. Two different factors influence the ordering of these lists. One factor is support for combining posting lists. For example, if posting lists are sorted by Doc ID, then one can take the intersection of two posting lists by reading them sequentially, in parallel, and performing efficient merge operations on the lists. If they are not sorted, then taking an intersection involves reading the smaller one into RAM, which can be expensive.

The other factor influencing the order of posting lists is ranking: if it is possible to rank documents heavily, or if it is possible to rank postings in a fashion that is highly correlated with the anticipated rank of documents, then ordering posting lists according to these ranking factors can aid in a so-called "top-N" queries in which the goal is to return only the top-Nth highest-rank documents.

Thus, the particular form of a posting in a posting list may thus take a variety of forms depending upon the application, and accordingly, while particular embodiments described herein may describe a posting list as a list of postings including Doc IDs, it can be appreciated that the techniques of the invention may be applied to any implementation of a posting list.

Systems and Methods for Querying Utilizing Query Deltas

As mentioned, the present invention is directed to systems and methods for automatically updating queries on a mutable data store, such as a PCDB. Accordingly, the invention expands upon the above described querying and indexing principles in order to provide the capability to continuously update the query, should the underlying result set satisfying the query change, in a manner that is seamless to the user.

In this regard, it is noted that "filtering" is a term used in the information services field whereby users of a service issue standing queries and the service returns newly-arriving documents that match the query. This is a more limited problem, however, than the problem addressed by the invention because filtering is concerned with the arrival of immutable documents, not mutable ones, and the main concern with filtering is bandwidth (rather than latency). When documents are immutable, the delta problem is limited to understanding if new documents match old queries. When old documents can change, then the query engine has to worry about old documents dropping out as well as new documents being added back in.

Thus, with the kind of querying considered by the invention, the query continuously operates as a specialized filter or lens on the data in the data store to correspondingly show the current view of the data in the data store satisfying the query as the data changes, without interfering with a user's enjoyment and utilization of the application or service that is performing the query. In this regard, the techniques of the invention are applicable not only to documents coming into the view represented by the query, but also to documents leaving the view as well as to changes to the documents satisfying the query. As mentioned above, in accordance with the invention, changes to a document include changes to the substance or content of the document, as well as changes to properties or other metadata associated with the document.

To illustrate a simple way to implement continuous querying of data in a mutable data store to update a view associated with the query, in FIG. 3A, the exemplary query of FIGS. 2A to 2C is shown to be executed by an exemplary application A. Accordingly, as shown in FIG. 3A, at time t=t1, query component 210 executes the query with exemplary terms Term1 and Term2 and retrieves a posting list PL1 satisfying terms Term1 and Term2. At time t=t2 (later than t1), however, two new documents have arrived in the data store 220 that satisfy the query. Thus, the data store has changed, and the view associated with the query requires updating to reflect these changes or deltas.

One way to solve the delta problem in this scenario (the delta(s) being the difference(s) between the data in the data store satisfying the query at time t=t2 and time t=t1) is to memorize, e.g., save in RAM, the current result set for the query, identify how the result set has changed by re-running the query, returning a new posting list, then sorting and merge comparing the lists. If there are multiple queries, the technique would implement this method for each query.

Thus, as shown in FIG. 3B, application A stores posting list PL at 300, thereby remembering the results obtained at time t=t1. Then, at 310, the query is executed again at time t=t3 (after t2), obtaining a second posting list PL2 in a similar manner at 320. At 330, via known algorithms for sorting and merge comparing, the posting lists PL1 and PL2 are processed as shown in FIG. 3C to form a list of deltas D—representing a posting list for the documents affected by the change. In this case, the deltas will point to new documents ND1 and ND2 which were added to data store 220 at t=t2. Armed with information about the affected documents, the view presented in UI 200 is updated to reflect the presence of ND1 and ND2 that also satisfy the query. As mentioned, this might mean increasing a count associated with the query by 2, since the number of results satisfying the query has increased by 2, or it may mean adding summary information associated with ND1 and ND2 to the list of results presented via UI 200 (or updating some other view suited to application A). For a changed document CD that changes at time t=t4, the approach is similar. The new result set obtained at time t=t3 becomes the remembered result set, and as a result of re-running the query, and comparing, the list of deltas D will then include a pointer to the changed document CD. The view or count is then updated accordingly.

However, with the proliferation of PCDB content described in the background, and the variance of information that a user may wish to track, the size of a result set might number in the thousands. Multiplied by many outstanding queries, and many changes to the document store, one can easily see that the memorization approach described in FIGS. 3A to 3C does not scale. This is particularly true if the desired result is merely an updated count. This is because, with an updated count, the application is not committed to storage of the result to the same extent where information or metadata about the documents themselves is to be displayed. Typically, an application A will only be presenting one, or a few, views (such as an email Inbox) at a time in any sort of detail. For the rest of the views, a count is sufficient until the user desires a more detailed view. Since the total number of views may be in the hundreds or thousands, and a mere count is all that is necessary for most views, storing and memorizing the results in RAM for all of those views is simply an unacceptable use of resources.

As a better alternative to this memorization approach, for changed document(s), the invention provides an "old version" and "new version" of the document(s) to a query executive, which can then run the query twice and decide if a change is an "add," "remove," or "update." While this "pairing approach" is more complicated than memorization, it scales better. Also, in accordance with various embodiments of the invention, the invention takes advantage of the notion that the substance of the documents themselves does not change, but rather only the tag-sets of the documents change. The nature of an email store serves as a good example for these embodiments of the invention. In this regard, the types of mutability typically associated with an email document typically include changing its location or folder, annotating the document, adding or removing a reference to another object or attachment, explicitly adding or removing metadata to help describe the document, and so on. Since the documents themselves do not change, but rather only their tag-sets change, the pair approach makes more and more sense as will become clear below.

Thus, in various embodiments of the invention, a query engine runs queries against two indexes: a first index that represents a previous state of documents and a second index that represents a current state of documents. The query is run twice and a delta analysis is performed, i.e., a determination is made as to which documents have changed in some respect from the previous state to the current, or new, state, and a view or a count associated with the query changes in accordance with the delta analysis. In one embodiment, transactions are batched by a transaction manager until an optimal number of documents have changed or a certain amount of time has passed prior to re-running the query and performing the delta analysis.

Figure 4A:
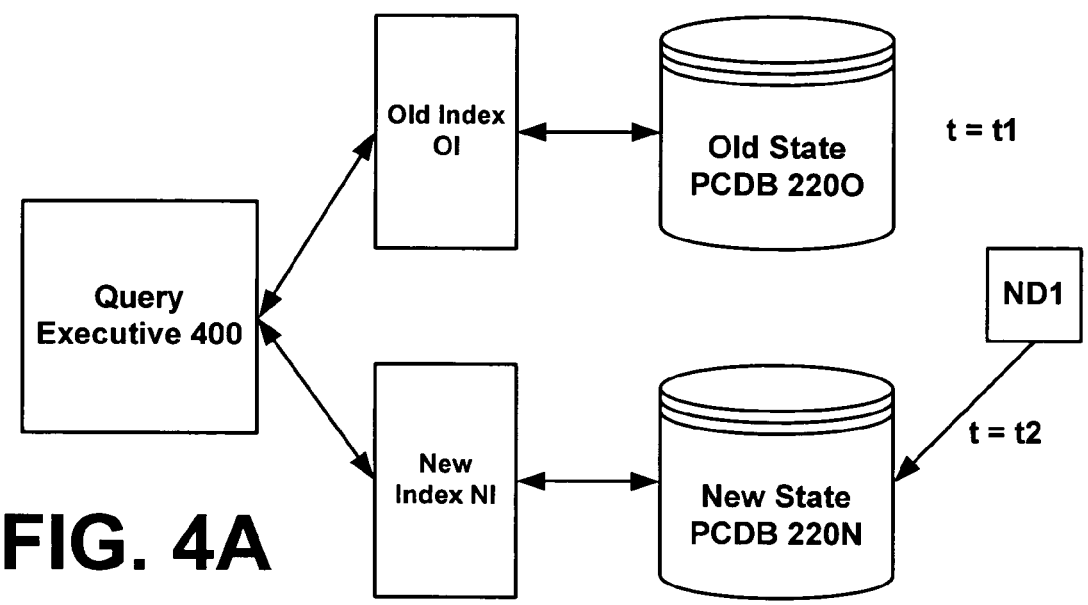
FIGS. 4A to 4C generally illustrate a new-state/old-state approach that improves over the memorization approach illustrated in FIGS. 3A to 3C.

Conceptually, this is illustrated in FIG. 4A. Whenever a change is made to the database, such as when a new document ND1 is added to the PCDB at time t=t2, the query is run by an executive 400 against an index OI representing the old state 220O of the PCDB and also against an index NI representing the new state 200N of the PCDB. By comparing the indexes according to any of a variety of known algorithms, the executive 400 determines that the difference between the two is the inclusion of ND1 in the index NI. In this discussion, representations or index pairs of sets of documents are thus communicated to the query executive 400 when changes occur.

It should be noted that there are many ways to represent sets of documents. One broad family of representations are called forward representations, which are representations of the sets of documents as sets of some form of the actual documents. Forward representations include the raw documents themselves, or some parsed representation of the document. Another broad family of representations are inverted representations, that is, representations of the documents as inverted files (a.k.a., full-text indexes). In one non-limiting embodiment of the invention, a hybrid approach is taken for representing sets of documents: the set of documents is represented as a mix or combination of forward representations and inverted representations. For instance, U.S. application Ser. No. 10/966,566 (RC Indexing) describes an exemplary non-limiting mix of forward representations (referred to therein as SDIs) and inverted representations (referred to therein as MDIs) that may be used in connection with the present invention.

Figure 4B:
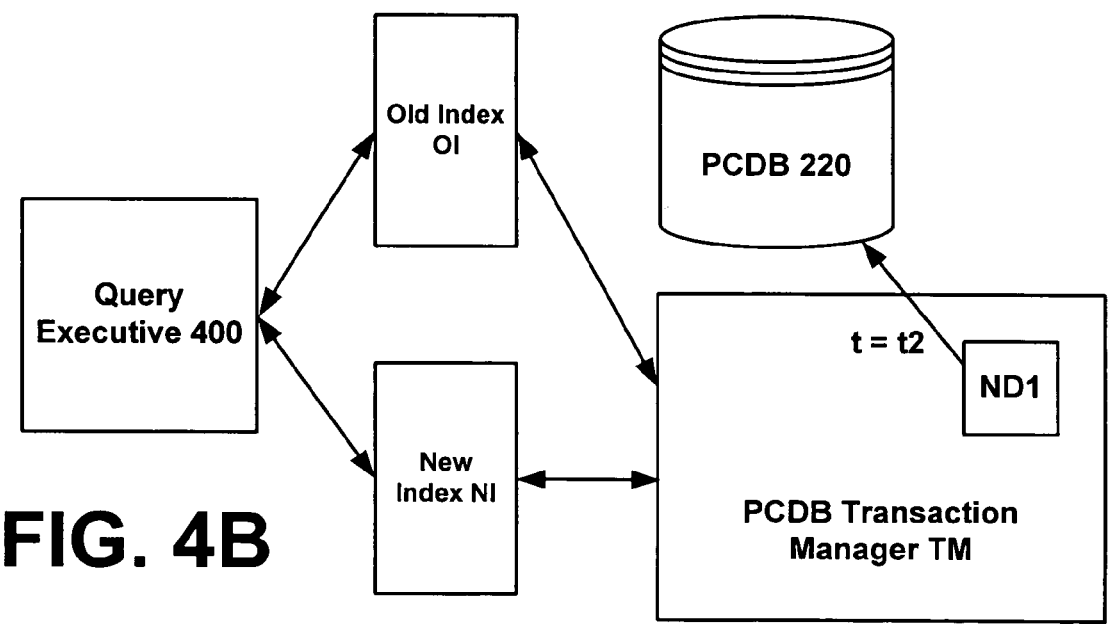

The maintenance of two databases, one representing an old state of the database and one representing a new state of the database (as implied by the illustration of FIG. 4A) is expensive and impractical. Moreover, given the projected size of PCDBs in the future, the computation that is implicated by many queries and the production and comparison of very sizable indexes OI and NI that would result would be prohibitive to implement. Thus, FIG. 4B illustrates the introduction of a transaction manager TM that, among a variety of tasks, manages the commitment of changes to the database 220. In this regard, it is noted that what is important for the comparison of OI and NI is that the differences become highlighted during the process, and that where OI and NI are the same becomes ignored. This is because it is the changes that are the source of updates to a list or a count being represented for a view on the data.

As a result, one can see that the transaction manager TM can play an integral role in creating index pairs OI and NI that only represent the source of change. Since transaction manager TM has perfect knowledge of what changes are committed to database 220, the transaction manager TM can generate an index pair for each such change, and forward the pair to the query executive 400 for comparison so that the view can be updated. For a count update, if the index pair represents a new document change, the count is incremented by one. If the index pair represents a document deletion from the store, the count is decremented by one. If the index pair represents a change to the tags of the document, the count remains the same. In a similar fashion, any view that is displayed via the UI of the application can also be updated accordingly based on the notion of whether the change is an add, delete or modify. In one embodiment, it is recognized that even though documents that are the same as represented by OI and NI do not aid in the process of determining what change is represented by the index pairs, the computational tradeoff is unnoticeable or insignificant if a few identical documents are represented by OI and NI due to the speed with which relatively small lists can be compared. Accordingly, where the transaction manager TM or other component responsible for generating the above-described index pairs OI and NI can otherwise "cut corners" by saving time or computation by being agnostic to the inclusion of a few additional documents that may be the same in each set represented by the index pairs, a net benefit can be realized.

Thus, as illustrated in FIG. 4B, upon committing new document ND1 to the database 220, transaction manager TM generates an index OI that does not reflect the existence of ND1, and also an index NI that does represent the addition of ND1. Query executive 400 then processes OI and NI, and determines that a new document ND1 has been added to the store. To the extent that ND1 satisfies an outstanding query, the view representing the query is then updated according to the above described "add, delete or modify" procedure.

Figure 4C:
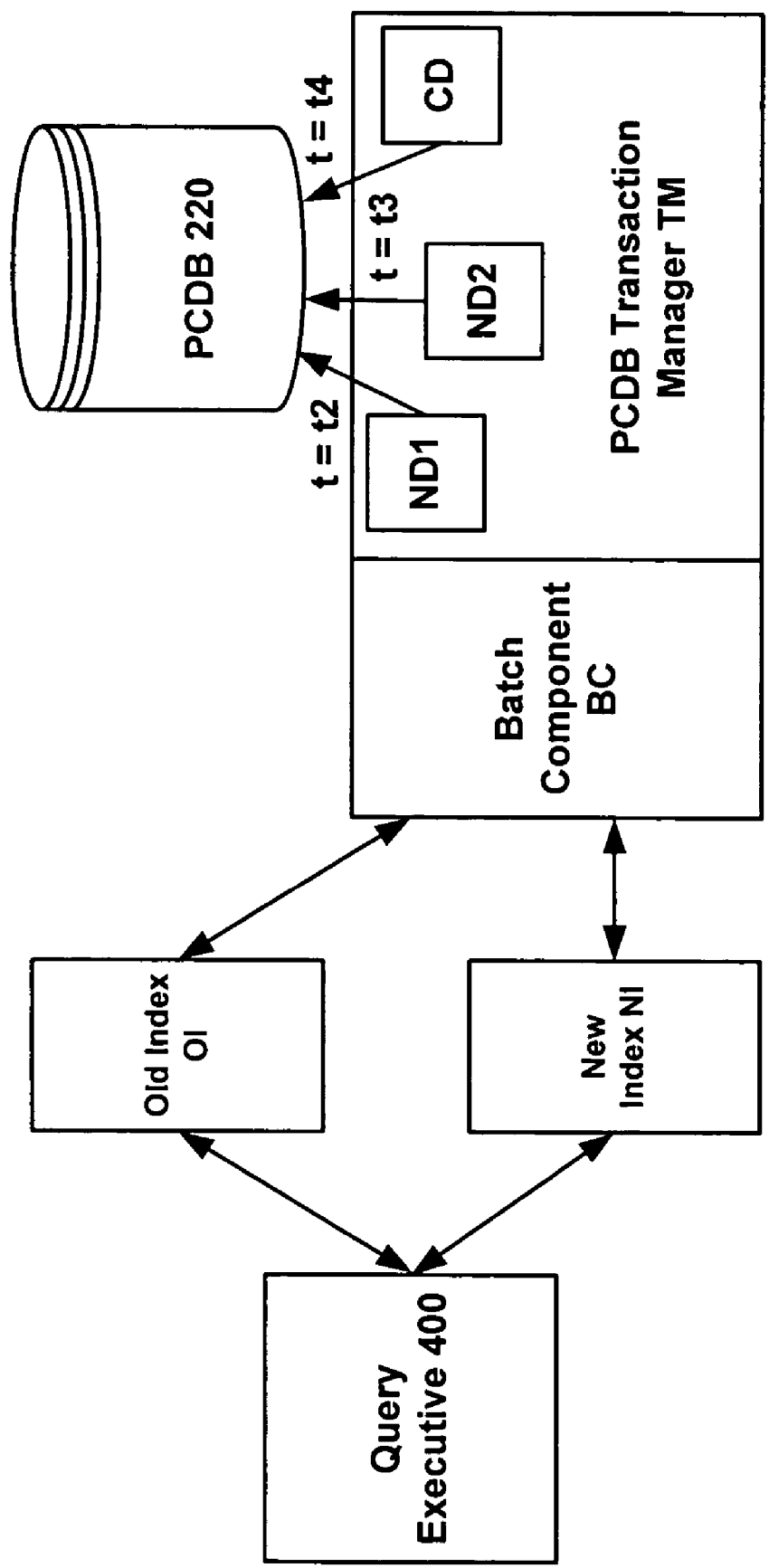

The system of FIG. 4B would be enough in a universe of content that did not change very frequently because for the most part, all of the above processing could be achieved between changes, or a simple FIFO queuing mechanism could be implemented for the extraordinary case. The universe of PCDBs, however, is contemplated herein to be changing frequently and, in conjunction, when the number of outstanding queries that may be run is considered, it is inefficient to process changes one at a time. One at a time processing also ignores a basic feature of changes in a computing system, which is that they tend to come in bunches as opposed to a steady stream with any measurable periodicity. Accordingly, FIG. 4C illustrates yet another improvement upon the above-described system. Namely, FIG. 4C introduces a batch component BC that optimizes the generation and delivery of index pairs to the query executive 400. Thus, new documents ND1 and ND2 may arrive at times t2 and t3 and some time might pass before a change to a document represented by changed document CD1 may occur at t4. Based on optimizing the deliver of index pairs, batch component BC may assess the number of changes and the time since the last delivery of changes before transmitting the index pairs to the query executive 400 for comparison and updating views and/or counts associated with affected outstanding queries.

Thus, the invention provides systems and methods for comparing a new state of the content store to an old state of the content store in connection with efficiently updating query result sets as the content store changes from the old state to the new state.

Figure 5:
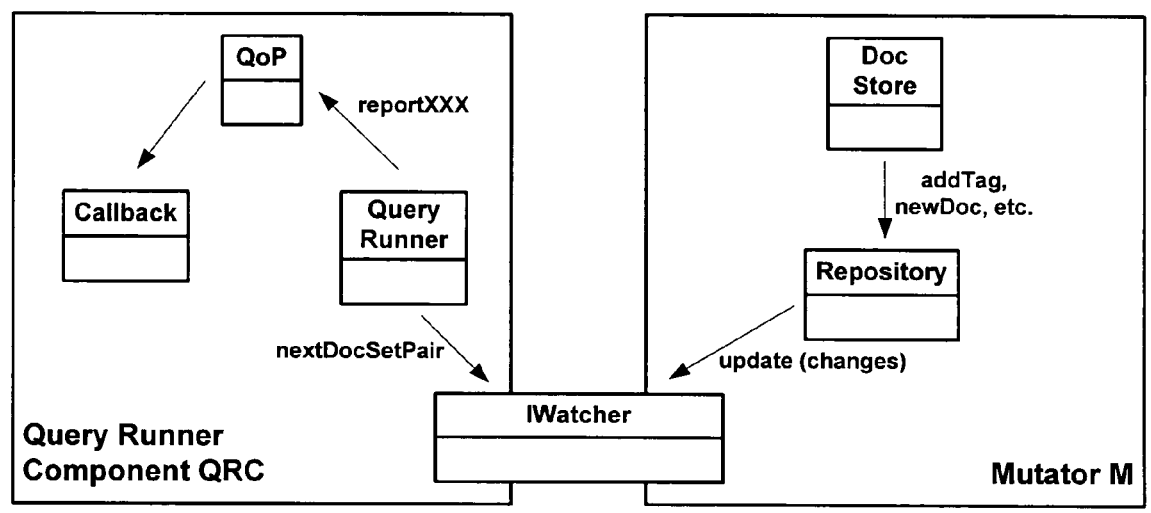
FIG. 5 illustrates a detailed non-limiting implementation of the new-state/old-state approach generally described and illustrated in connection with FIGS. 4A to 4C.

FIG. 5 illustrates an exemplary non-limiting implementation of the present invention in more detail. On the right-hand side, mutating code M adds, removes, and changes documents (this mutating code may sometimes, but need not always, run in its own thread). Those changes are pushed to query-running code QRC (also sometimes run in its own thread) via a producer/consumer queue labeled IWatcher in the diagram. As described above, changes are pushed into the query-running code QRC in the form of pairs of document sets, one pair representing the current state of the documents and the other representing the previous state. By receiving both states, the query code can easily determine whether the change is an addition, a deletion, or a change.

Changes are thus made by the mutator thread on the right and are communicated to the query-runner thread on the left. The communication channel between these two threads is the "IndexWatcher" object Iwatcher. An IndexWatcher in accordance with the invention is effectively a producer-consumer queue of IndexPair objects (the mutator M producing, the query-runner QRC retrieving and consuming).

When the mutator thread commits a transaction, it places into this queue an IndexPair for the transaction. This IndexPair is a pair of Index objects, an "old state" Index and a "new state" Index. As mentioned, an Index object can be a traditional inverted file, a forward representation, or some mix of forward and inverted representations. Where the Index object is a traditional inverted file, for instance, given a term, the Index object returns a posting list of documents containing that term. In one non-limiting embodiment, as mentioned above, only the tag sets for the documents change and thus, these Index objects include posting lists for both the immutable documents and the mutable tag sets. The old and new Index objects share posting lists for the immutable terms, but have different lists for the mutable tags. The Indexes contained by an IndexPair contain postings for the same universe of documents. Mutator M ensures that this universe includes all new and changed documents (and it may include more documents that will be the same between the two indexes). In this implementation, the Query Runner QRC sits in a loop asking the IndexWatcher to return the next pair in the queue. When the queue is empty, this loop blocks waiting for an update. When a new pair is returned, the query is compiled against both the old and new Indexes. From these two results sets, a delta is computed, and results are pushed up to the User Interface via the Callback object (in the lower-left).

Only those documents that were changed need be sent to the query runner by the mutator M to achieve the appropriate result from the view update standpoint. While it is necessary for those documents to be sent to achieve the correct result, it also acceptable for additional documents to be sent, as mentioned in connection with FIG. 4B above. (In fact, in the extreme, it would still be correct for mutator M to send all documents to the query runner.) Thus, in a non-limiting embodiment, the invention sometimes takes advantage of this fact by sending a few extra documents to the query runner when doing so is cheaper than carefully tracking exactly the modified documents. In doing this, however, it should be noted that the new and old sets should agree such that any old unchanged document be included in the new set and the old set.

In providing the above described systems and methods for querying based on query deltas in accordance with the invention, a high-degree of concurrency can be supported, including multiple readers and multiple writers. To support this concurrency, standard concurrency-control techniques can be used by the transaction manager TM, such as reader-writer locks. Additionally, the query runner batches results to be returned to the user interface. In practice, if results were not batched, and each Doc ID was returned one at a time—the overhead would be too high and the latency might also seem too high as a result. On the other hand, if the batches are too big, the UI will seem unresponsive since changes will not be pushed to the user quickly enough. Accordingly, the invention optimizes the batch size dynamically in view of the number of changes and time passed since the last batch was processed. Changes made by the mutator M are made in units called transactions. Thus, when the transaction rate is high, we batch multiple transactions into a single old/new pair, amortizing much overhead.

It is often the case that many of the outstanding queries share common components. For example, in our system, almost all queries share the term "-folder:Deleted/*" so that deleted items are not returned. To take advantage of this commonality, in various non-limiting embodiments of the invention, two steps are performed. First, the query runners of the invention are capable of running more than one query at the same time so that common parts across these multiple queries are computed only once and are shared. Second, caching is used to share the results common to multiple queries across different query runners.

The invention thus runs a relatively large number of fixed queries against a stream of new and changing documents. As it is discovered that a new or changed document does or does not match one of these fixed queries, the result-set or count of that query is updated. To achieve this, a new-state/old-state approach is taken and by taking such an approach, the invention provides systems and methods that track the counts of large numbers of queries without consuming substantial space for them, which covers many of the factors and advantages that will make the use of PCDB fast and scalable now, and into the future. These factors and advantages include continuous querying, support for efficient counting of results and scalable concurrency.

First, the invention provides continuous, rather than discrete, query experience. With a discrete query, a result set is computed and returned, and the query terminates. With the invention, queries are used to populate aspects of the UI that need to be updated based on changes to the database. For example, when the "Inbox" is selected for display in the message list, the message list is populated by a Query Runner executing the query "folder:Inbox". As the user moves messages out of the Inbox and/or new messages arrive in the background, the contents of this message list—and thus the results of this query—are updated automatically.

Moreover, with respect to counting, the invention allows users to save an arbitrary number of searches. These "saved searches" are given names and are listed in a convenient location, e.g., on the left-hand side of the UI (where email folders are traditionally displayed). The invention thus displays a count of the messages that match each of these saved searches. These counts are tallied and provided to the UI via a special kind of Query Runner called a Query Count Runner.

Further, the invention enables scalable concurrency of queries. Due to the efficiencies provided by the invention, the UI of an application utilizing the invention is capable of running a large number of Query Runners in parallel. For an email application, for instance, Query Runners may be started as follows: the main message list (e.g., Inbox) is populated by one, a large number are started for displaying message counts (e.g., for folders) and a few less-obvious ones can be run for other purposes (e.g., providing fast access to one's calendar data from within the mail UI). Thus, Query Runners in accordance with the invention are light-weight and run in parallel.

Mathematical Modeling of Query Deltas of the Invention

A "query" in the context of the invention may be considered to select, as a predicate, a set of documents out of a collection/database of documents. If "D" is the collection of documents and Q is a query, then Q(D) is the subset of D selected by Q.

In the general case, a system that utilizes the output of a query performs some processing on that output. Thus, the general problem presented is one of efficiently computing $F(Q(D))$, where "F" represents the particular processing, e.g., some function, to be done on the subset of D selected by Q. "F" might be the identity function, in which case, $F(Q(D))$ reduces to Q(D), i.e., the actual output of the query, and F could also be a count of the result set, as described in various embodiments above. It is important to note, however, that F could be any kind of processing performed on the output of the query, such as one or more averages based on the output, one or more statistical properties or characteristics (e.g., median, mode, etc.), one or more estimates of a statistical property, and so forth.

If a database is changing, $D\_0$ designates its value at time 0, $D\_1$ designates its value at time 1, etc. If the value of $F(Q(D\_0))$ is known and it is desired to compute $F(Q(D\_1))$, one way to do this is to compute $F(Q(D\_1))$ directly by re-running the query over the entire database, but this could be expensive, particularly for a large PCDB described in the background. For many functions F, however, it turns out that there is an update function dF such that $F(Q(D\_1))$ can be much more efficiently computed as represented by the following equation:

$$F(Q(D\_1))=dF(F(Q(D\_0)), dQ(dD\_0, dD\_1))$$

In this equation, $dD\_0$ and $dD\_1$ together represent any changes that are made to the database made from time 0 to time 1. Thus, from the representation of $dD\_0$ and from the representation of $dD\_1$, both of which should be of orders of magnitude smaller than D, a representation of $dQ(dD\_0, dD\_1)$ can be computed. For a special class of functions F (such as identity or result set count described above in detail), the determination of $F(Q(D\_1))$ becomes much more efficient.

Moreover, in the case of some functions F (e.g., an average), there might not be a direct dF but there might be a related function F' that can be transformed (via G) into F, as follows:

$$F(Q(D\_1))=G(dF'(F'(Q(D\_0)), dQ(dD\_0, dD\_1)))$$

Thus, in accordance with the invention, changes to a database are identified, first and second representations of the input side of those changes are generated as $dD\_0$ and $dD\_1$, respectively, and that input is transformed into a "third representation" which is the useful output $dQ(dD\_0, dD\_1)$, at least for some classes of F, F' or G. In this regard, on the input side, changes to the document store are either additions (a new document), modifications (a changed document) or deletions (deleted documents) and also, the changes represented by the third representation can also be thought of as "add, modifies, and deletes" as they relate to a particular query output.

Thus, in accordance with the invention, given this useful output dQ(dD_0, dD_1), it can be used as input for all kinds of useful F/dF pairs to efficiently track the value of F(Q(D)) as D changes.

While some exemplary embodiments herein are described in connection with software residing on a computing device, one or more portions of the invention may also be implemented via an operating system, application programming interface (API) or a "middle man" object, hardware, firmware, such that a UI or mechanism for querying may be included in, supported in or accessed via any of a distributed computing framework's languages and services. There are thus multiple ways of implementing the present invention, e.g., an appropriate API, tool kit, driver code, operating system, standalone or downloadable software object, etc. which enables applications, nodes, devices and services to use the UI for querying according to the invention. The invention contemplates the use of the invention from the standpoint of an API (or other software object), as well as from a software or hardware object that communicates querying and associated document index information. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to search and retrieve information from a content store. Thus, the techniques for querying in accordance with the present invention may be applied to a variety of applications and devices. For instance, various implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the mechanism(s), technique(s) and/or algorithm(s) of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-implemented method, comprising:

generating a first representation of a set of one or more documents of a plurality of documents, wherein the first representation represents a state of the set of one or more documents before at least one change is made to at least one document of said plurality of documents;

after said at least one change is made to at least one document of said plurality of documents, performing the steps of:

causing a currently-stale view or currently-stale count for at least one current query to be displayed on a user interface;

wherein the currently-stale view or currently-stale count is based at least in part on a result set of at least one previously-executed query that was executed on said plurality of documents before said at least one change was made;

generating a second representation of the set of one or more documents of the plurality of documents, wherein the second representation represents a state of the set of one or more documents after said at least one change was made, whereby said first representation and said second representation together represent at least all of the documents affected by said at least one change;

comparing the first and second representations outputting an updated view or count by, to form a third representation that includes representations of differences between said first and second representations;

while said currently-stale view or currently-stale count is displayed, on said user interface utilizing said third representation to update said currently-stale view or currently-stale count on said user interface to reflect said at least one change;

wherein the step of comparing is performed by one or more processors.

2. The computer-implemented method according to claim 1, wherein said currently-stale view or currently-stale count comprises:

an output of a function applied to the result set.

3. The computer-implemented method according to claim 1, wherein said currently-stale view or currently-stale count comprises:

at least one of (a) information in the result set and (b) a count of information in the result set.

4. The computer-implemented method according to claim 3, wherein said utilizing step further comprises utilizing said third representation to update said count of information in the result set by determining individually whether the differences represented by said third representation represent additions or deletions of documents from said result set.

5. The computer-implemented method according to claim 4, wherein said utilizing step further comprises, for a difference represented by said third representation, incrementing said count of information in the result set if the difference represented by said third representation represents an addition and decrementing said result set count if the difference represented by said third representation represents a deletion.

6. The computer-implemented method according to claim 3, wherein said utilizing step further comprises utilizing said third representation to update said count of information in the result set by determining individually whether the differences represented by said third representation represent additions, modifications or deletions of documents from said result set.

7. The computer-implemented method according to claim 6, wherein said utilizing step further comprises, for a difference represented by said third representation, incrementing said count of information in the result set if the difference represented by said third representation represents an addition, decrementing said result set count if the difference represented by said third representation represents a deletion, and not modifying said result set count if the difference represented by said third representation represents a modification.

8. The computer-implemented method according to claim 1, wherein said at least one previously-executed query that was executed before said at least one change comprises:

at least part of at least two queries combined to form the result set.

9. The computer-implemented method according to claim 1, further comprising:

caching at least a part of the third representation as a result to be shared among at least two queries during utilizing said third representation to update said view or count to reflect said at least one change.

10. The computer-implemented method according to claim 1, whereby said first representation and said second representation include at least one document not affected by the at least one change.

11. The computer-implemented method according to claim 1, wherein said comparing step further comprises identifying whether the differences between said first and second representations represent an addition of a document, a deletion of a document or a change to a document.

12. The computer-implemented method according to claim 11, wherein said comparing step further comprises identifying whether said differences represent a change to at least one metatag of a document.

13. The computer-implemented method according to claim 1, wherein said first and second representations include a mix of forward and inverted representations.

14. The computer-implemented method according to claim 1, wherein said first and second representations include inverted representations.

15. The computer-implemented method according to claim 1, further comprising batching a plurality of instances of said at least one change prior to said generating the second representation.

16. The computer-implemented method according to claim 15, wherein said batching step comprises batching dynamically based upon a change rate for changes to be made.

17. The computer-implemented method according to claim 1, wherein said comparing step further comprises mapping said at least one change to a change in said currently-stale view or currently-stale count by determining whether said at least one change represents an addition to the result set, a modification to the result set, or a deletion to the result set.

18. A computing device comprising means for performing the computer-implemented method of claim 1.

19. A computer readable storage medium storing one or more computer executable instructions, which, when executed on one or more processors, causes performance of the computer-implemented method of claim 1.

20. A computing device comprising a processor in communication with a data store, wherein said data store stores a plurality of documents in at least one storage unit, the computing device including:

a data store component configured to identify at least one change to be made to the data store;

an old state data structure generation component configured to generate a first data structure representing a set of one or more documents of the plurality of documents, wherein the first data structure represents a state of the set of one or more documents before at least one change is made to content of the data store;

a user interface component configured to cause a currently-stale view or currently-stale count for at least one current query to be displayed on a user interface after said at least one change is made to the data store, based at least in part on a result set of at least one previously-executed query that was executed on said plurality of documents before said at least one change was made;

a new state data structure generation component configured to generate a second data structure of the set of one or more documents of the plurality of documents, wherein the second data structure represents a state of the set of one or more documents after the at least one change was made, whereby said first data structure and said second data structure together represent at least all of the documents affected by the at least one change;

a comparator configured to perform an analysis involving the first and second data structures, to form a third data structure that includes representations of differences between said first and second data structures;

an update component configured to utilize said third data structure to update said currently-stale view or currently-stale count, while said currently-stale view or currently-stale count is displayed on said user interface, to reflect said at least one change.

21. A computer-implemented method comprising:
after at least one change is made to content of an email data store, performing the steps of:
transmitting via an application programming interface (API) at least one current query to be executed on said email data store to a query handler for said email data store;
receiving, by said API in response to the at least one current query, a third representation from said query handler that is based at least in part on a comparison of:
(A) a first representation of a set of one or more email documents of a plurality of email documents, wherein the first representation represents a state of the set of one or more email documents before the at least one change is made, and
(B) a second representation of the set of one or more email documents of the plurality of email documents, wherein the second representation represents a state of the set of one or more email documents after the at least one change is made, whereby said first representation and said second representation together represent at least all of the email documents affected by the at least one change;
displaying, on a user interface, a currently-stale view or currently-stale count for said at least one current query based at least in part on a result set of at least one previously-executed query that was executed on said plurality of email documents before said at least one change was made; and
while displaying said currently-stale view or currently-stale count, utilizing the third representation to update said currently-stale view or currently-stale count to reflect said at least one change;
wherein the step of comparing is performed by one or more processors.

22. The computer-implemented method according to claim 21, wherein said currently-stale view or currently-stale count comprises at least one of (a) information in the result set and (b) a count of information in the result set.

23. The computer-implemented method according to claim 21, wherein said third representation represents a mapping of said at least one change to a change in said currently-stale view or currently-stale count.

24. A computer readable storage medium storing one or more computer executable instructions, which, when executed by one or more processors, causes performance of:
identifying at least one change to be made to at least one document of a plurality of documents;
generating a first representation of a set of one or more documents of the plurality of documents, wherein the first representation represents a state of the set of one or more documents before the at least one change is made to the at least one document in said plurality of documents;

after said at least one change is made to the at least one document, causing performance of:
causing a currently-stale view or currently-stale count for at least one current query to be displayed on a user interface based at least in part on a result set of at least one previously-executed query that executed on said plurality of documents before said at least one change was made;
generating a second representation of the set of one or more documents of the plurality of documents, wherein the second representation represents a state of the set of one or more documents after the at least one change is made, whereby said first representation and said second representation together represent at least all of the documents affected by the at least one change to the data store;
comparing the first and second representations to form a third representation that includes representations of differences between said first and second representations; and
updating said currently-stale view or currently-stale count, while said currently-stale view or currently-stale count is displayed, on said user interface to reflect said at least one change based at least in part on the third representation.

25. The computer readable storage medium according to claim 24, wherein the one or more one or more computer executable instructions further causes performance of:
analyzing said third representation to update an output of a function applied to said result set.

26. The computer readable storage medium according to claim 24, wherein said currently-stale view or currently-stale count comprises:
at least one of (a) information in the result set and (b) a count of information in the result.

27. The computer readable storage medium according to claim 24, wherein said at least one previously-executed query that was executed before said at least one change comprises:
at least part of at least two queries combined to form the result set.

28. The computer readable storage medium according to claim 24, wherein the one or more one or more computer executable instructions further causes performance of:
caching at least a part of the third representation as a result to be shared among at least two queries during analysis of said third representation by analyzing to update said view or count to reflect said at least one change.

29. The computer readable storage medium according to claim 24, wherein said comparing comprises identifying whether said differences represent an addition of a document, a deletion of a document or a change to at least one metatag of a document.

30. The computer readable storage medium according to claim 24, wherein said first and second representations comprise a mix of forward and inverted representations.

31. The computer readable storage medium according to claim 24, wherein the one or more one or more computer executable instructions further causes performance of: batching a plurality of changes of said at least one change prior to generating the second representation.

32. The computer readable storage medium according to claim 31, wherein said batching comprises batching dynamically based upon a change rate for changes to be made.

33. The computer readable storage medium according to claim 24, wherein said comparing further comprises mapping said at least one change to a change in said currently-stale view or currently-stale count by determining whether said at least one change represents an addition to the result set, a modification to the result set, or a deletion to the result set.

34. The computer-implemented method according to claim 1, further comprising:
causing a plurality of batched results to be returned to the user interface;
optimizing a batch size dynamically in view of a number of changes and an amount of time passed since a last batch was processed.

35. The computer-implemented method according to claim 1, further comprising:
a mutator making changes to the at least one document of the plurality of documents in units known as transactions; wherein when a transaction rate is high, the mutator batches multiple transactions into a single old/new pair, thereby amortizing overhead.

36. The computer-implemented method according to claim 1, further comprising:
a plurality of query runners running more than one query in parallel so that common parts across these multiple queries are computed only once and are shared.

37. The computer-implemented method according to claim 36, further comprising:
sharing results common to multiple queries across different query runners using caching.

38. The computer-implemented method according to claim 1, further comprising:
running a large number of fixed queries against a stream of new and changing documents.

39. The computer-implemented method according to claim 1, further comprising:
performing continuous rather than discrete querying.

40. The computer-implemented method according to claim 1, further comprising:
using queries to populate aspects of the user interface that need to be updated based at least in part on changes to the at least one document of said plurality of documents.

41. The computer-implemented method according to claim 1, further comprising:
saving a predetermined number of searches.

42. The computer-implemented method according to claim 41, further comprising:
naming the saved searches and listing them in a location visible to an end-user.

43. The computer-implemented method according to claim 42, wherein the location is a left-hand side of the user interface.

44. The computer-implemented method according to claim 34, further comprising:
enabling scalable concurrency of queries by running a large number of query runners in parallel.

45. The computer-implemented method of claim 1, further comprising:
generating a first index that represents an old state of the set of one or more documents; and
generating a second index that represents a new state of the set of one or more documents.

46. The computing device of claim 20, wherein:
as part of the analysis, the comparator is configured to execute the at least one current query against a first index for the first data structure, and is configured to execute the at least one current query against a second index for the second data structure.

47. The computer-implemented method of claim 21, wherein said comparison includes:
retrieving first data from a first index that represents an old state of the email data store; and
retrieving second data from a second index that represents a new state of the email data store.

48. The computer readable storage medium of claim 24, wherein the one or more one or more computer executable instructions further causes performance of:
generating a first index that represents an old state of the set of one or more documents; and
generating a second index that represents a new state of the set of one or more documents.

49. The computer-implemented method according to claim 21, further comprising storing said third representation in persistent memory.

* * * * *